(12) United States Patent
Weidner

(10) Patent No.: US 11,135,983 B2
(45) Date of Patent: Oct. 5, 2021

(54) ACOUSTIC DAMPING PART, METHOD FOR PRODUCING A SOUND-INSULATED VEHICLE BODY AND MOTOR VEHICLE

(71) Applicant: Volkswagen Aktiengesellschaft, Wolfsburg (DE)

(72) Inventor: Nadja Weidner, Leiferde (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 544 days.

(21) Appl. No.: 16/142,707

(22) Filed: Sep. 26, 2018

(65) Prior Publication Data

US 2019/0092253 A1 Mar. 28, 2019

(30) Foreign Application Priority Data

Sep. 26, 2017 (DE) ...................... 10 2017 217 083.2

(51) Int. Cl.
*B60R 13/08* (2006.01)
*B60K 37/00* (2006.01)
*B60R 13/02* (2006.01)
*G10K 11/162* (2006.01)

(52) U.S. Cl.
CPC ............ *B60R 13/083* (2013.01); *B60K 37/00* (2013.01); *B60R 13/0256* (2013.01); *B60R 13/0815* (2013.01); *G10K 11/162* (2013.01); *B60R 2013/0287* (2013.01)

(58) Field of Classification Search
CPC ............ B60R 13/0256; B60R 13/0815; B60R 2013/0287; B60R 13/083; B60K 37/00; G10K 11/162

USPC ........................................................ 181/290
See application file for complete search history.

(56) References Cited

U.S. PATENT DOCUMENTS

| 5,876,826 A * | 3/1999 | Hoffmann ............... B60R 13/08 |
| | | 428/95 |
| 6,186,887 B1 * | 2/2001 | Dauvergne ......... B60H 1/00028 |
| | | 296/208 |
| 6,550,835 B2 * | 4/2003 | Davis, Jr. ............... B60K 37/00 |
| | | 296/37.12 |

(Continued)

FOREIGN PATENT DOCUMENTS

| DE | 102004062502 A1 | 7/2006 |
| DE | 102004062505 A1 | 7/2006 |

(Continued)

*Primary Examiner* — Forrest M Phillips
(74) *Attorney, Agent, or Firm* — Muncy, Geissler, Olds & Lowe, P.C.

(57) ABSTRACT

An acoustic damping part for arrangement in a motor vehicle, a method for producing a sound-insulated vehicle body, and a motor vehicle, in particular a passenger car is provided. The acoustic damping part comprises a sound insulation element, in particular a foam element, for substantially planar contact with at least one portion of a motor vehicle body, in particular an end wall, in order to reduce the transmission of sound into a passenger compartment. Furthermore, the acoustic damping part has at least one plug part connected to the sound insulation element with a plug for insertion into an opening of a vehicle body component or component composite. This serves to produce a non-positive and/or positive connection of the acoustic damping part with material of the vehicle body component or component composite that forms the opening.

13 Claims, 3 Drawing Sheets

(56) References Cited

U.S. PATENT DOCUMENTS

| | | | |
|---|---|---|---|
| 6,749,929 B1* | 6/2004 | Enkler | F02B 77/13 |
| | | | 428/304.4 |
| 6,786,521 B1* | 9/2004 | Jaffke | B60R 13/08 |
| | | | 296/1.06 |
| 2009/0015029 A1* | 1/2009 | Nabert | B60R 13/06 |
| | | | 296/39.3 |
| 2015/0366310 A1* | 12/2015 | Richardson | H04B 1/3888 |
| | | | 224/191 |
| 2016/0118033 A1* | 4/2016 | Owen, Jr. | G10K 11/168 |
| | | | 181/290 |
| 2016/0129855 A1* | 5/2016 | Check | B32B 3/266 |
| | | | 181/290 |
| 2020/0047816 A1* | 2/2020 | Tanaka | B62D 25/20 |
| 2020/0172180 A1* | 6/2020 | Yamagishi | B62D 25/2072 |

FOREIGN PATENT DOCUMENTS

| | | | | |
|---|---|---|---|---|
| DE | 102006031396 B3 | 9/2007 | | |
| EP | 0733004 A1 | 9/1996 | | |
| EP | 1104497 A1 | 6/2001 | | |
| EP | 1262358 A1 | 12/2002 | | |
| EP | 2014515 A2 | 1/2009 | | |
| EP | 2481644 A1 | 8/2012 | | |
| JP | H0458461 U | 5/1992 | | |
| JP | 2001151041 A | 6/2001 | | |
| JP | 2005161914 A | 6/2005 | | |
| JP | 2007210381 A | 8/2007 | | |
| KR | 19980046352 U | 9/1998 | | |
| WO | WO-2013051320 A1 * | 4/2013 | | B32B 27/065 |

\* cited by examiner

ACOUSTIC DAMPING PART, METHOD FOR PRODUCING A SOUND-INSULATED VEHICLE BODY AND MOTOR VEHICLE

This nonprovisional application claims priority under 35 U.S.C. § 119(a) to German Patent Application No. 10 2017 217 083.2, which was filed in Germany on Sep. 26, 2017, and which is herein incorporated by reference.

BACKGROUND OF THE INVENTION

Field of the Invention

The present invention relates to an acoustic damping part for arrangement in a motor vehicle, a method for producing a sound-insulated vehicle body, and a motor vehicle, for example, a passenger car.

Description of the Background Art

In order to reduce the sound entering a motor vehicle passenger compartment, it is known to arrange sound insulation elements on the components of the vehicle body that delimit the passenger compartment. For example, portions of vehicle bodies are covered with sound-absorbing foam parts in order to reduce vibrations occurring in these areas and to minimize the transmission of sound.

Furthermore, it is known to seal openings in the vehicle body with sound insulation elements. For this purpose, for example, foam blocks are used, which are inserted into the respective openings and optionally fixed in the respective position on the material forming the opening. Alternatively or additionally, the existing openings can be masked off so that in this way the passage of sound is reduced.

Individual aspects of this solution known from the prior art are shown in FIG. 1. This shows an acoustic damping element 15, which is designed for surface contact with the end wall of a motor vehicle. It follows the contour of the end wall, not shown here, and lines the latter on its side facing the passenger compartment. The sound insulation element is a foam element which serves for acoustic insulation or the reduction of sound transmission into the passenger compartment.

Holes arranged in lateral body components can be sealed by means of separate foam blocks 40 and are acoustically insulated in this way. The foam blocks 40 are shown schematically and are typically inserted into the openings. In addition, self-adhesive web pieces 50 are arranged, which serve to further insulate or to seal the openings.

It is evident that the solutions described entail a high cost for components and, consequently, high costs for tools, material, logistics, and installation.

DE 10 2006 031 396 describes a cockpit arrangement in a motor vehicle. An end wall is disposed between an engine compartment and a passenger compartment and forms a surface. On the inside of the end wall, a flat-fitting acoustic damping element is arranged. In the passenger compartment there is a cockpit module. The area of the acoustic damping element located between the end wall and the cockpit module has ribs running in the vehicle transverse direction, which abut the cockpit module. These can be compressed depending on the distance between the end wall and the cockpit module and thus compensate for manufacturing tolerances.

EP 0 733 004 B1, which corresponds to U.S. Pat. No. 5,876,826, discloses an acoustic damping coating for lining acoustically excited surfaces. This has a top covering layer and a sound-insulating lining firmly adhered to the underside thereof, which is flush with an acoustically excited surface arranged opposite, such as a vehicle floor. The lining is subdivided into a plurality of modules which firmly adhere to the underside of the covering layer and can each be brought to bear flush with corresponding, opposite partial surfaces of the acoustically excited surface.

SUMMARY OF THE INVENTION

It is therefore an object of the present invention to provide an acoustic damping part and a method for producing a sound-insulated body, with which a reduction of the transmission of sound into a passenger compartment of a motor vehicle can be realized in a particularly simple and cost-effective manner.

A first aspect of the invention provides an acoustic damping part for mounting in a motor vehicle. This comprises a sound insulation element, in particular a foam element, for substantially planar contact with at least one portion of a motor vehicle body, in particular an end wall, in order to reduce the transmission of sound into a passenger compartment. Furthermore, the acoustic damping part has at least one plug part connected to the sound insulation element with a plug for insertion into an opening of a vehicle body component or component composite for producing a non-positive (i.e. force-fit) and/or positive (i.e. interlocking/form-fit) connection of the acoustic damping part with a material forming the opening of the vehicle body component or component composite.

The sound insulation element can be formed flat. It can be designed for substantially planar contact with a portion, typically a component or a component composite, of a motor vehicle body. This area is particularly acoustically excited or excitable. Thus, the installation of the sound insulation element can serve to reduce the transmission of sound into a passenger compartment. In particular, the sound insulation element serves to dampen the sound radiating through the area, the component and/or its openings, and/or the damping of sound-generating movements, such as vibrations, of the component.

The sound insulation element can be configured for abutment with at least one portion of an end wall. An end wall, also referred to as a firewall, is in particular a component that separates the engine compartment from the passenger compartment of a motor vehicle. This runs transversely in the vehicle.

The plug is configured to be inserted into the opening along a direction of insertion. Of course, it is also possible for a plurality of vehicle body components or a vehicle body component composite to jointly form the opening, which is then arranged between the respective components. When used as intended, the inserted plug serves to connect the acoustic damping part with the vehicle body component of a motor vehicle containing the opening.

The vehicle body component or the vehicle body component composite forming the opening can be or can comprise the vehicle body component on which the sound insulation element can be brought into abutment, for example, the end wall. It can also be another component. In particular, the vehicle body comprises a plurality of sheet metal components in the lateral region, which together form the opening.

The acoustic damping part can have two plug parts. In normal use, these are arranged right and left on the acoustic damping part. The plugs arranged on the respective plug parts can thus be arranged on the right and left of the end wall of the motor vehicle in order to seal respective openings.

The plug part and/or the plug can be made of foam. Plug part and plug can be made in one piece.

The solution according to the invention has the advantage that only a single component is needed to sound-insulate the end wall and to seal openings, and in this way provides a particularly simple and cost-effective option for reducing the transmission of sound into a passenger compartment. The installation effort is significantly reduced, since after arranging the sound insulation element on the end wall, only the insertion of the plug(s) is necessary in order to mount the inventive sound insulation element as intended.

An exemplary embodiment of the acoustic damping part is characterized in that the sound insulation element and the plug part can be connected to each other in an articulated manner.

An articulated connection can be a connection which allows for a relative pivotal movement of the connected parts by at least 5°, in particular by at least 20° and in one embodiment, by at least 45° to each other.

For example, the joint axis can be formed by a bendable or malleable material region. For this purpose, in particular a suitable flexible material is used. In this way, no further components are necessary to realize the joint.

This has the advantage that installation is further simplified, since after arranging the sound insulation element on the portion of the motor vehicle body, a relative movement between the plug part, and thus the plug, and the sound insulation element can be realized, which is equally a relative movement between the plug and the material forming the opening. In this way, the plug can be pivoted relative to the opening for insertion therein.

In particular, when used as intended, a first plane defined by the sound insulation element in the area of the connection with the plug part and a second plane defined by the plug part are aligned with each other at an angle between 30° and 150°, in particular between 60° and 120° and for example at approximately 90°. In other words, the plug parts project approximately perpendicular from the sound insulation element so that the respective plugs are configured for arrangement in openings which are formed by components which are aligned substantially along the vehicle longitudinal direction.

The plug can be designed to form an undercut with the material forming the opening. In this way, a positive connection between the acoustic damping part and the material forming the opening can be produced in such a way that the translational degree of freedom of the plug is blocked against the insertion direction.

In other words, the plug can have a first region of a lesser dimension, for example of a smaller diameter, which is followed along the insertion direction by a second region with a greater dimension at least along a direction that is oriented perpendicular to the insertion direction.

The plug can be made of a flexible material which can be deformed for insertion into the opening and which then resumes its original shape when forming the undercut. In other words, the second region is compressed during insertion and inserted through the opening. The plug is inserted further into the opening, so that the first area is arranged in the opening and the second area can increase its volume again, thus forming the undercut.

The opening can be a through-hole. Alternatively, the opening may have a cross section widening in any manner along the direction of insertion.

This has the advantage that the hold of the plug in the material forming the opening is improved and in this way the acoustic damping part can be arranged particularly quickly, easily and securely on the vehicle body.

At least a first extension of the plug perpendicular to the insertion direction can be greater than a second extension of the plug along the insertion direction. In this way, the plug is designed to seal a flat opening.

For example, a planar opening located transverse to the insertion direction or perpendicular to the material forming the opening can have an opening region which is larger than the thickness of the material forming the opening along the insertion direction. In particular, a third extension of the opening, which is aligned perpendicular to the first and second extension, is greater than the second extension. Such openings are arranged on body components for various reasons, for example in order to save weight and/or to allow the outflow of immersion medium in the dip treatment of the body component. In this embodiment, the plug is thus suitable for covering or sealing such openings in the vehicle body. In particular, the plug is exactly adapted to the arbitrarily shaped geometry of the opening so that it can seal the latter while achieving efficient sound insulation. This embodiment has the advantage that for different purposes, existing openings in vehicle bodies can be easily and inexpensively sealed or insulated against the passage of sound.

The opposite side of the sound insulation element side that is arranged for abutment against the portion of the motor vehicle body and/or the side of the plug part that is opposite the plug can at least partially be formed as a heavy layer. Alternatively or additionally, at least in some areas a heavy layer is arranged on the opposite side of the side of the sound insulation element that is arranged for abutment against the region of the component and/or on the side of the plug part that is opposite the plug.

A heavy layer can be a layer of a comparatively heavy material which is used to prevent the transmission of vibrations or the acoustic insulation of acoustically excited surfaces. The heavy layer typically has a specific gravity applied over the entire area between 1 kg/m$^2$ and 10 kg/m$^2$, in particular between 2 kg/m$^2$ and 5 kg/m$^2$.

The heavy layer, which can also be referred to as heavy foil, is resiliently connected to the component to be acoustically insulated and serves in this way as a counterbalancing mass. In sum, this reduces the vibrations of the component to be acoustically insulated, thus steadying it. For resilient connection of the heavy layer with the component, in particular a foam part is used, such as the plug part and/or the sound insulation element. Such is typically suitable for extracting energy from the vibration system.

The heavy layer can be designed planar and substantially completely covers the sound insulation element or the plug part. In this case, it follows in particular the corresponding contour of the sound insulation element or plug part. On the side of the heavy layer facing away from the sound insulation element or the plug part, further layers may be arranged, such as a web layer.

This has the advantage that particularly extensive acoustic insulation is possible and that in this way, the sound penetrating into the passenger compartment is minimized.

An embodiment of the acoustic damping part is characterized in that the articulated connection is realized via the heavy layer and/or via a foam part.

The foam part may comprise the plug part, the plug and/or the sound insulation element. In one embodiment, sound insulation element, plug part and plug are integrally formed as a foam part. The areas of the foam part in which the plug part and the sound insulation element are connected to each other serve as a hinge. In this embodiment, different areas of the plug part and/or the sound insulation element may be covered with a heavy layer. The heavy layer can also be arranged in that area of the foam part in which the plug part and the sound insulation element are connected to one another. Thus, the joint may be formed in two layers and include the heavy layer and the foam part.

In another embodiment, the heavy layer connects the sound insulation element and the plug part with one another. In other words, the heavy layer alone represents the articulated connection between the sound insulation element and the plug part. The sound insulation element on the one hand and the plug part or the plug on the other hand are arranged or fastened to the respectively different sides of the joint. The corresponding area of the heavy layer can also form the plug part, wherein the plug, in particular made of foam, is arranged thereon.

The aforementioned embodiments have the advantage that the joint is formed by existing components and thus can be produced in a particularly simple and cost-effective manner.

The sound insulation element and the plug part, in particular comprising the plug, can be produced in one piece. For example, they can be produced as a foam part and are shaped according to the geometric configurations of the respective components. This results in the advantage of a particularly simple and cost-effective production of the parts of the acoustic damping part according to the invention.

A method for producing a sound-insulated body is also provided. In this case, an inventive acoustic damping part and at least a part of a motor vehicle body are provided with a vehicle body component or component composite that forms an opening. The plug is inserted into the opening so that a non-positive and/or positive connection of the acoustic damping part is produced with the material of the vehicle body component or component composite forming the opening.

An undercut can be realized by means of the plug with the material that forms the opening, wherein the plug part temporarily deforms during insertion and at least in the area located in the opening, and then, after exiting the area through the opening, essentially again takes on its original shape.

With the method according to the invention, particularly simple and quick installation of a sound-insulated vehicle body is possible. It is not necessary to arrange separate components such as foam blocks in order to seal or acoustically insulate openings that are located in vehicle body components.

An embodiment of the method is characterized in that the sound insulation element of the acoustic damping part can be substantially brought to bear flat against at least one portion of the motor vehicle body, namely at least one area of an end wall. This is done in particular before inserting the plug. In particular, the sound insulation element is fixed to the area in a suitable manner.

This has the advantage that the positioning of the acoustic damping part serves equally for positioning the plug part or the plug, thus further simplifying installation.

Another aspect of the invention is a motor vehicle, for example, a passenger car. This has at least one inventive acoustic damping part, wherein in particular the plug part is inserted into an opening of a motor vehicle body component or component composite.

Typically, the acoustic damping part comprises two plug parts, each with a plug, which are inserted into two openings of vehicle body components or component composites.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
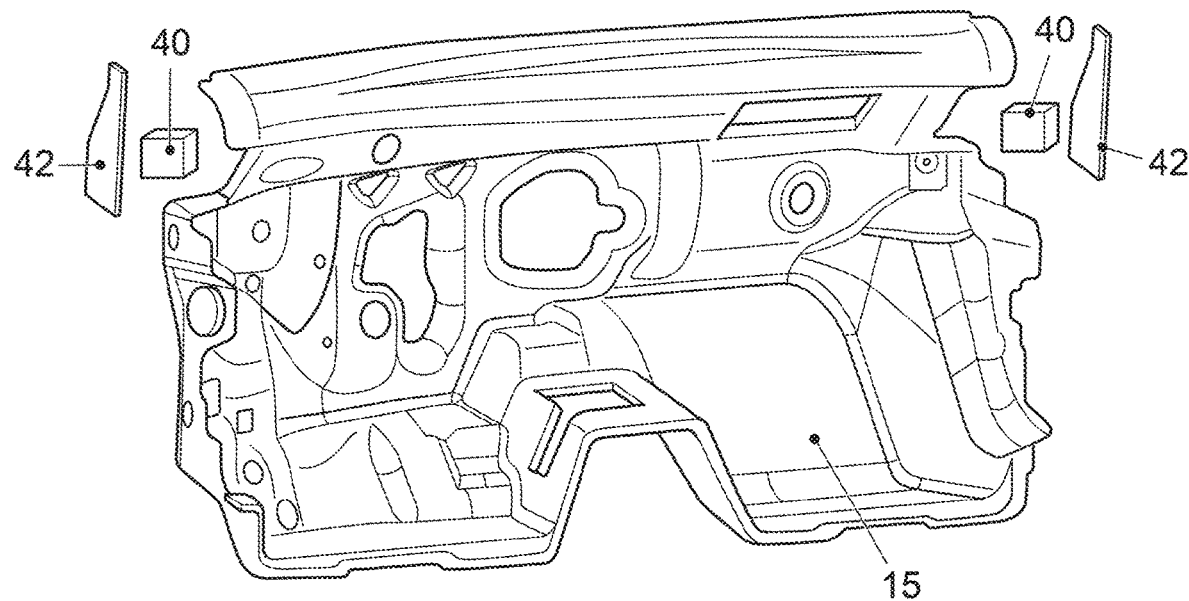
FIG. 1 is a perspective view of a system for acoustic damping known from the prior art.

FIG. 1 has already been discussed for purposes of explaining the prior art.

Figure 2:
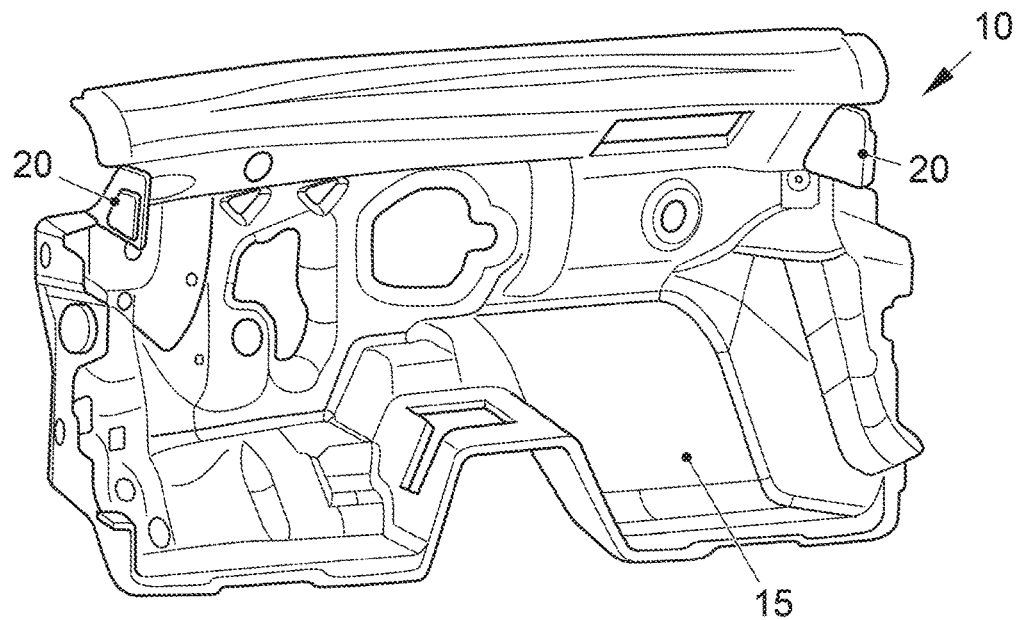
FIG. 2 is a perspective view of the acoustic damping part according to an exemplary embodiment of the invention.

FIG. 2 shows the acoustic damping part 10 according to the invention in a motor vehicle. Shown is a view looking in the direction substantially along the direction of travel of a motor vehicle comprising the acoustic damping part 10. The acoustic damping part 10 comprises a sound insulation element 15 for surface contact with an end wall of a motor vehicle. During normal use of the acoustic damping part 10, in the drawing, the not-shown end wall is arranged behind said part and separates the engine compartment located behind said wall from the passenger compartment located in front of the sound insulation element 15. In other words, the acoustic damping part 10 delimits the passenger compartment towards the front. The sound insulation element 15 serves to reduce the transmission of sound from the engine compartment into the passenger compartment. It is made of foam and essentially follows the contour of the end wall.

Two plug parts 20 are arranged on the sound insulation element 15. These are arranged on the latter at an angle of about 90° with respect to the corresponding adjacent region of the sound insulation element 15 and point opposite the direction of travel of the motor vehicle.

Figure 3:
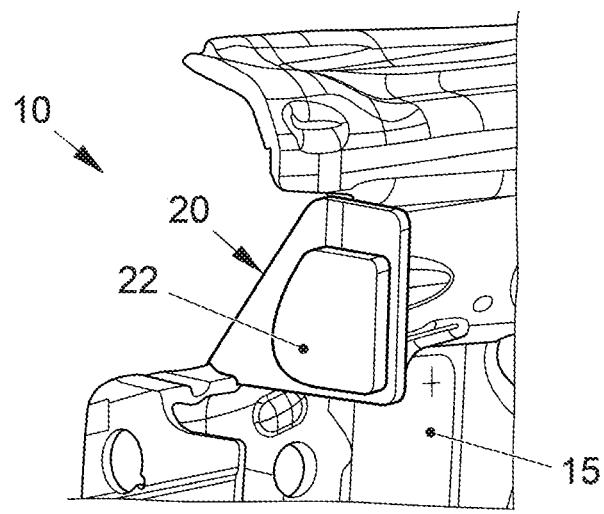
FIG. 3 is a perspective detailed view of the acoustic damping part from FIG. 2.

A detailed view of the driver-side, left plug part 20 is shown in FIG. 3. This is designed as a level, planar element on which a plug is arranged. The plug part 20 and plug 22 are formed integrally with the sound insulation element 15 as a foam part. The plug part 20 and the sound insulation element 15 are hinged together in a diagonally extending edge. The joint is thereby realized by the common material, the foam.

The plug 22 has a planar design and in each case has a large height and width relative to its depth measured along the insertion direction. The plug 22 is designed to be inserted into a planar opening formed in the vehicle body and serves to seal or acoustically insulate the opening and fix the acoustic damping part 10 to the material forming the opening.

Figure 4:
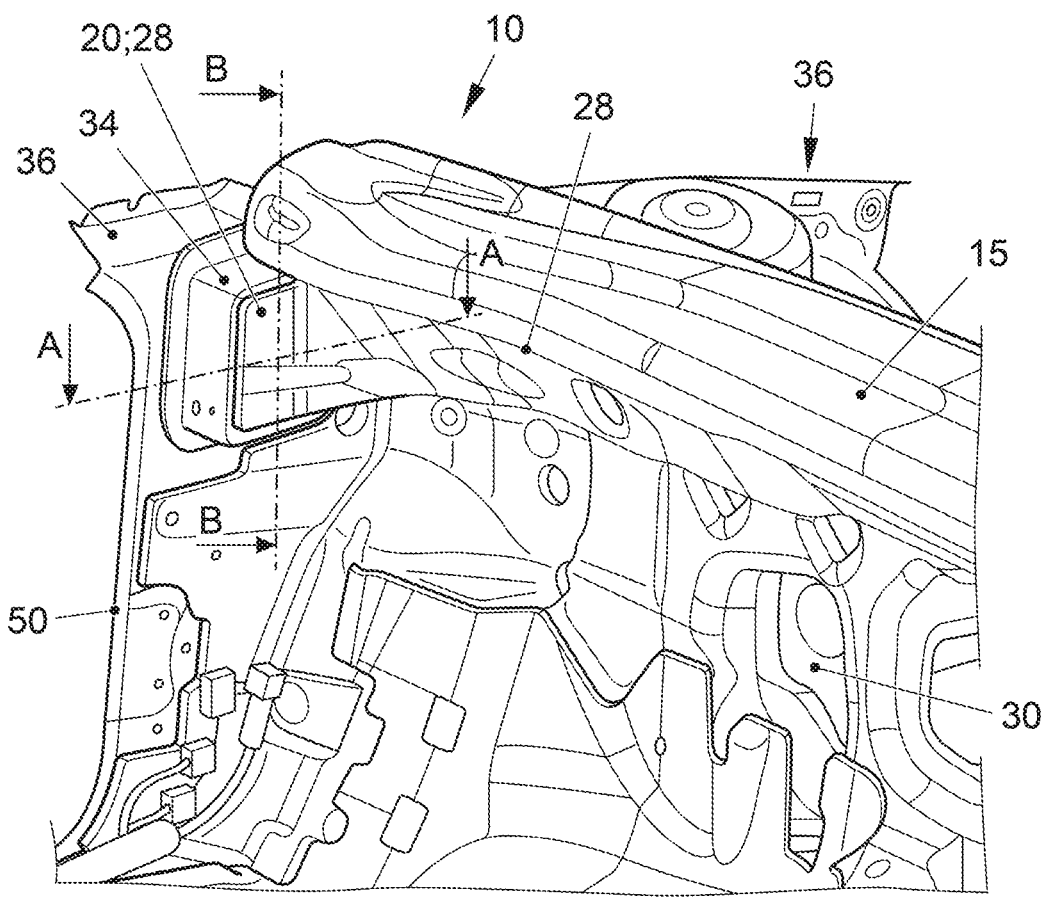
FIG. 4 is a perspective view of an area of a sound-insulated vehicle body according to the invention.

FIG. 4 shows part of a sound-insulated vehicle body produced by means of the method according to the invention. Shown is the end wall 30, which is clad in the direction of the passenger compartment with the acoustic damping part 10 according to the invention. The acoustic damping part 10 comprises, as already shown, the sound insulation element 15 which covers the end wall 30 rearward in a planar manner, and two plug parts 20 which are laterally hinged thereto, each with a plug.

On the left side of the figure, the door frame 50 of the driver's door is shown. Between the door frame 50 and the end wall 30 are vehicle body components 34, which form an opening. The latter is not shown here since it is sealed by means of the plug, likewise not shown. Only the side of the plug part 20 facing away from the plug is shown. Like the entire sound insulation element 15, this side is covered with a heavy layer 28. Other components 36 of the motor vehicle body form the door frame 50 and the lateral boundary of the engine compartment.

Together with the foam, from which the plug part 20, plug and sound insulation element 15 are integrally formed, the heavy layer 28 forms the articulated connection between the plug part 20 and the sound insulation element 15. Said connection is formed in the diagonal edge analogous to what is shown in FIG. 3.

Figure 5:
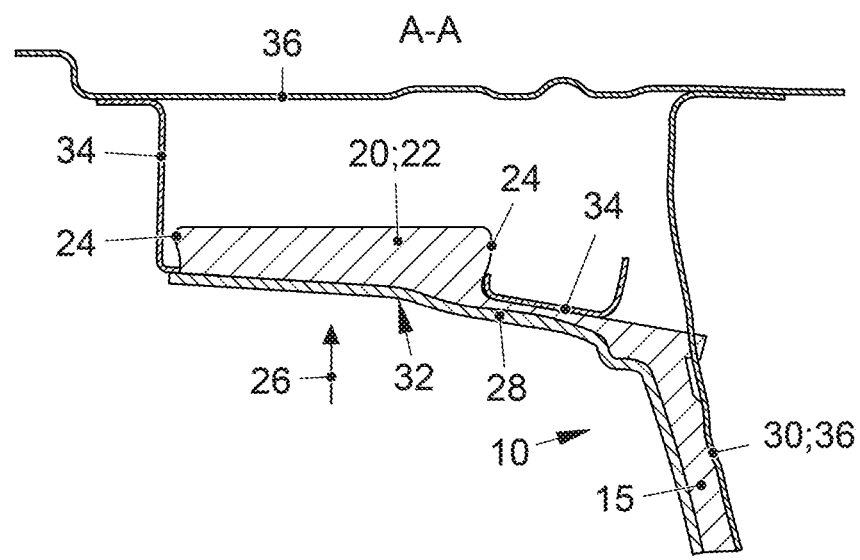
FIG. 5 is a sectional drawing A-A of the acoustic damping part from FIG. 4.

FIG. 5 shows the section A-A, which is indicated in FIG. 4. It can be seen that the vehicle body components 34 form an opening 32 which is sealed by the plug 22. The plug 22 is a part of the plug part 20, which together with the sound insulation element 15 forms the acoustic damping part 10 according to the invention. As already described, the elements mentioned are integrally formed as a foam part. The heavy layer 28 is arranged flat on the inner side facing the passenger compartment. Together with an area made of foam, it forms the articulated connection between the plug part 20 and the sound insulation element 15. Said connection is formed in the portion of the foam part shown on the right and forms an angle of about 65° between said components. The sound insulation element 15 shown underneath in the illustration is located on the end wall 30, a component 36 of the motor vehicle body.

Furthermore, it can be seen that the plug 22 is adapted to form an undercut 24 with the material forming the opening 32. Viewed along the insertion direction 26, the front part of the plug 22 has a greater width than the rear part of the plug 22 located in the area of the opening 32. This realizes a positive connection of the plug 22, and thus of the acoustic damping part 10, with the material forming the opening 32 in which the translational degree of freedom of the plug 22 is blocked against the insertion direction 26.

Figure 6:
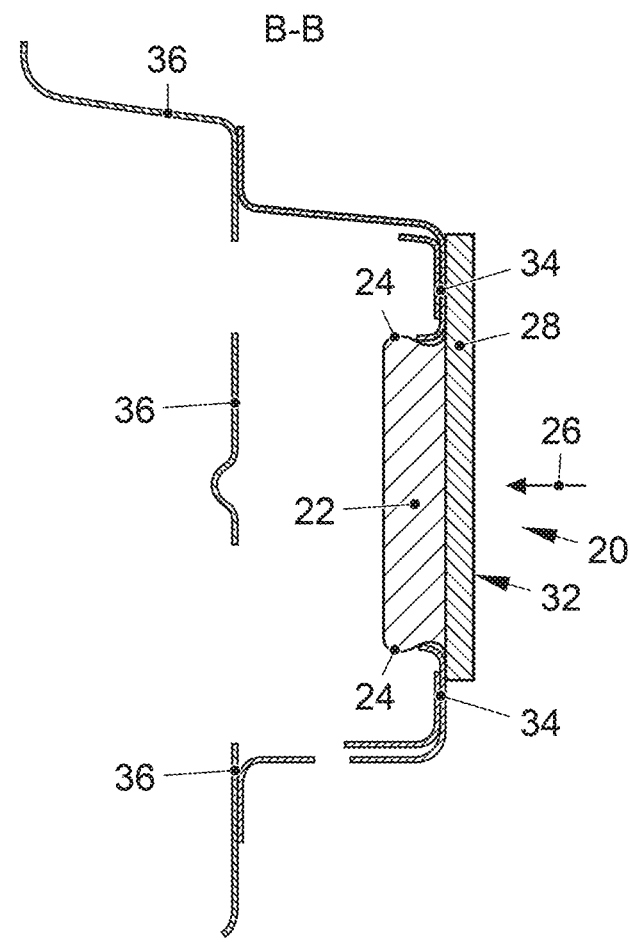
FIG. 6 is a sectional drawing B-B of the acoustic damping part from FIG. 4.

As can be seen in FIG. 4, section B-B shown in FIG. 6 is aligned perpendicular to section A-A shown in FIG. 5. This in turn shows the motor vehicle body components 34 forming the opening 32, further components 36 of the motor vehicle body, and the plug 22 arranged in the opening 32 together with the associated portion of the plug part 20. An undercut 24 is also formed in this direction. Thus, the area of the plug 22 inserted through the opening 32 also extends upwards or downwards, beyond the portion of the plug 22 located in the area of the opening 32.

In this illustration, it can also be seen that the plug 22 is bounded by the heavy layer 28. In the area of the vehicle body components 34 material forming the opening 32, above or below the opening 32, no foam material is arranged. These portions of the plug part 20 are formed exclusively by the heavy layer 28, which bears directly against the corresponding vehicle body components 34 in these areas.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An acoustic damping part for arrangement in a motor vehicle, the acoustic damping part comprising:
    a sound insulation element having a first side for substantially planar contact with at least one area of a motor vehicle body to reduce a transmission of sound into a passenger compartment;
    at least one plug part connected to the sound insulation element;
    wherein the at least one plug part includes a plug protruding from a first side thereof, the plug adapted to be inserted into an opening of a vehicle body component or a component composite to provide a non-positive and/or a positive connection of the acoustic damping part with a material of the vehicle body component or component composite forming the opening, and
    wherein the sound insulation element and the at least one plug part are hinged together via a living hinge.

2. The acoustic damping part according to claim 1, wherein the plug forms an undercut with the material forming the opening so that a positive connection of the acoustic damping part with the material forming the opening is produced such that a translational degree of freedom of the plug is blocked against an insertion direction.

3. The acoustic damping part according to claim 1, wherein at least a first extension of the plug substantially perpendicular to an insertion direction is greater than a second extension of the plug along the insertion direction so that the plug is configured to seal the opening.

4. The acoustic damping part according to claim 1, wherein a second side of the sound insulation element that is opposite to the first side and/or a second side of the at least one plug part that is opposite to first side having the plug, is covered, at least in some areas, with a heavy layer.

5. The acoustic damping part according to claim 4, wherein the heavy layer connects the sound insulation element and the at least one plug part with one another.

6. The acoustic damping part according to claim 1, wherein the sound insulation element and the at least one plug part comprising the plug are integrally formed.

7. A method for producing a sound-insulated vehicle body, the method comprising:
    providing the acoustic damping part according to claim 1;
    providing at least one part of a motor vehicle body with the vehicle body component or component composite forming the opening; and
    inserting the plug into the opening so that the non-positive and/or positive connection of the acoustic damping part is created with the material of the vehicle body component or component composite forming the opening.

8. The method for producing a sound-insulated vehicle body according to claim 7, wherein, before inserting the plug, the first side of the sound insulation element of the acoustic damping part is brought into abutment substantially flat against at least a portion of the motor vehicle body or at least a region of an end wall.

9. A motor vehicle or a passenger car comprising at least one acoustic damping part according to claim 1, wherein the at least one plug part is inserted in the opening of a motor vehicle body component or component composite.

10. The acoustic damping part according to claim 1, wherein the sound insulation element is a foam element.

11. The acoustic damping part according to claim 1, wherein the at least one area of the motor vehicle body is an end wall.

12. The acoustic damping part according to claim 1, wherein the sound insulation element and the at least one plug part are connected together by the living hinge, and wherein a heavy layer is provided at the living hinge.

13. The acoustic damping part according to claim 12, wherein the heavy layer covers at least a portion of the sound insulation element and at least a portion of the at least one plug part and wherein the heavy layer extends beyond an outer periphery of the portion of the at least one plug part to bear directly against the vehicle body component or the component composite.

\* \* \* \* \*